United States Patent [19]

Wilczak et al.

[11] Patent Number: 4,647,602

[45] Date of Patent: Mar. 3, 1987

[54] METHOD OF DISPERSING FLUOROPLASTICS IN POLYMERIC COMPOSITIONS

[75] Inventors: Boguslaw G. Wilczak, Shelton; Edward V. Wilkus; Alexander F. Wu, both of Trumbull, all of Conn.

[73] Assignee: General Electric Company, Bridgeport, Conn.

[21] Appl. No.: 729,450

[22] Filed: May 1, 1985

[51] Int. Cl.$^4$ .............................. C08K 9/00; C08K 9/02; C08L 27/18

[52] U.S. Cl. ................................ 523/204; 523/206; 523/346; 524/545; 524/546; 525/199; 525/200

[58] Field of Search .................. 523/204, 206, 346; 525/199, 200; 524/546, 545

[56] References Cited

U.S. PATENT DOCUMENTS

| | | | |
|---|---|---|---|
| 3,702,267 | 11/1972 | Grot | 521/91 |
| 3,793,287 | 2/1974 | Fitz et al. | 524/432 |
| 3,980,612 | 9/1976 | Gangal | 524/440 |
| 3,998,770 | 12/1976 | Malhotra | 524/238 |
| 4,026,863 | 5/1977 | Iseki et al. | 523/205 |
| 4,123,401 | 10/1978 | Berghmans | 525/199 |
| 4,257,929 | 3/1981 | Borman | 523/209 |
| 4,263,184 | 4/1981 | Leo | 524/925 |
| 4,334,037 | 6/1982 | Allen | 525/199 |
| 4,338,376 | 7/1982 | Kritzler | 524/462 |
| 4,370,436 | 1/1983 | Nakamura | 524/506 |
| 4,387,168 | 6/1983 | Morita | 525/200 |
| 4,440,879 | 4/1984 | Kawachi et al. | 523/200 |
| 4,451,616 | 5/1984 | Kawachi et al. | 525/178 |
| 4,507,439 | 3/1985 | Stewart | 525/200 |

*Primary Examiner*—Herbert J. Lilling
*Attorney, Agent, or Firm*—Hedman, Gibson Costigan & Hoare

[57] ABSTRACT

This invention provides a method of dispersing a fluoroplastic in a polymer composition. The method comprises the steps of comminuting the fluoroplastic to a uniform dispersion, admixing with the fluoroplastic a finely divided solid adherent material that will coat at least a portion of said fluoroplastic to form a coated fluoroplastic and combining said coated fluoroplastic with a polymer using intensive mixing means.

13 Claims, No Drawings

METHOD OF DISPERSING FLUOROPLASTICS IN POLYMERIC COMPOSITIONS

BACKGROUND OF THE INVENTION

Fluoroplastics are added to various thermoplastic compositions to modify performance properties of the subsequent end articles. When these fluoroplastics are dispersed in polymeric compositions, problems are encountered in obtaining a uniform dispersion because of the agglomerates that tend to form when fluoroplastics are blended with other thermoplastics in the melt state. The presence of agglomerates of fluoroplastics results in an erratic dispersion of the fluoroplastic in the polymeric composition. This erratic dispersion can cause large fiber "whiskers" to be present in the melt blended composition; unless extended and uneconomic mixing cycles are utilized, which even then may not suffice.

The presence of the undispersed fluoroplastics may cause problems in processing the polymeric composition due to clogging of the screen in the extruder. This results in excessive head-pressure build up that may be unsafe and also may damage the extrusion equipment. In addition, the extrudate may contain the large-fiber "whiskers" that detract from the aesthetic and performance properties of the product.

SUMMARY OF THE INVENTION

The present invention provides a method of dispersing a fluoroplastic in a polymer composition. The method comprises the steps of:

(a) comminuting the fluoroplastic to a uniform dispersion;

(b) admixing with the fluoroplastic a finely divided solid adherent material that will coat at least a portion of said fluoroplastic to form a coated fluoroplastic; and (c) combining said coated fluoroplastic with a polymer using intensive mixing means.

Accordingly, it is a primary object of this invention to provide a method of dispersing fluoroplastics completely in polymer compositions so that homogeneous dispersions are formed. It is also an object of this invention to provide a method for forming dispersions of fluoroplastics in polymer compositions.

It is also an object of this invention to provide a more rapid method for dispersing fluoroplastics in a polymer composition.

It is also an object of this invention to provide a method which makes possible the more efficient use of batch-type production equipment by making possible a shorter processing cycle.

These and other objects of the invention will become apparent from the specification.

DETAILED DESCRIPTION OF THE INVENTION

The process of the invention is directed to the dispersion of fluoroplastics such as polytetrafluoroethylene; fluorinated ethylene-propylene copolymer; perfluoroalkyoxy resin; ethylene-tetrafluoroethylene copolymer; polyvinylidene fluoride; polychlorotrifluoroethylene; ethylene-chlorotrifluoroethylene copolymer and polyvinylfluoride. These fluoroplastics are well known and are commercially available.

The fluoroplastic should be first reduced to solid particles having a size of from 4 to 35 U.S. standard mesh. Fluoroplastics may be obtained in particles or if necessary they may be chopped, diced or ground using techniques known to those in the art.

The solid adherent material should be used in finely divided form and should be chemically inert with regard toother components of the polymeric composition. It should adhere to and intermingle with the fluoroplastic so that it is effective in preventing agglomeration of the fluoroplastic particles. Suitable materials include solid particulate materials such as aluminum silicate, silica, talc, alumina and wollastonite, as well as graphitic and amorphous carbon blacks. These solid particulate materials should be in finely divided form.

The coating of the fluoroplastic may be carried out by dry blending using an appropriate container and agitation means. If desired wet blending, using a suitable volatile liquid followed by drying or vacuum evaporation of the liquid may be used. The amount of solid adherent material may range in weight proportions from 1:100 to 100:1 of solid adherent to fluoroplastic. The carrier thermoplastics comprise polymers such as ABS, acetal homopolymers and copolymers, acrylics, ionomers, polyamides, polycarbonates, linear polyesters, polyethylene, polyethylene copolymers such as ethylene-propylene and ethylene-vinyl acetate, polypropylene, polystyrene, polysulfone, polyphenylene oxide, vinyl polymers and the like. The thermosettable polymers include cross-linkable versions of the preceding polymers, and additionally phenolics, melamine, unsaturated polyesters, urea resins and the like. These and other polymers are described in Modern Plastics Encyclopedia 1982–1983 which is incorporated by reference.

It is understood that these polymer compositions may also contain pigments, stabilizers, reinforcements, adjuvants, curing agents, extrusion aids, fillers, gloss reducers, flame retardants, curing agents, etc.

The finely divided solid adherent material may be pretreated with the 0.05% to 15.0% by weight of a silane coupling agent, as well as silane derivatives such as silicones. These materials are described in the Modern Plastics Encyclopedia, 1982–1983, pp 148–151, which is incorporated by reference. The polymer composition which is to receive the solid adherent-fluoroplastic mixture may be prepared using high shear mixing means such as a Banbury mill or two-roll mixing mill. Thereafter the composition may be extruded and formed into its ultimate configuration usin conventional techniques.

DESCRIPTION OF THE PREFERRED EMBODIMENTS

The following example is given to illustrate the invention. It should not be construed as limiting the invention.

EXAMPLE

A 5 gallon can with a removable top is provided with a metal screen made up of 1.0 mm soldered wire having square holes 12 mm on a side. On top of this screen is another 0.8 mm soldered wire having square holes 6 mm on a side. The screens are at midpoint and parallel to the can bottom. Then 4 lbs. of kaolin clay treated with 1% silane (Translink 37) is dropped through the screen layers onto the bottom of the can. Then on top of the screen layers is placed 4 lbs. of polytetrafluoroethylene (Teflon-6) in the form of loose particles and fair size chunks. The can is shaken until all the polytetrafluoroethylene had dropped through the screen and thus is composed of agglomerates not larger than 6 mm across. The can cover is then secured in place and the can is then fairly gently rotated end over end for about 2 minutes. During this time the repeated passage of the Translink 37/Teflon-6 loose mixture through the screens gives progressive gentle subdivision of Teflon-6 agglomerates, plus intermingling with Translink 37 particles which thus prevents the Teflon-6 from subsequently packing into intractable larger lumps, either on standing or adding to a mixing machine. The Translink 37/Teflon-6 material thus intermixed is then combined in a Banbury mixer with the following:

|  | Parts Weight |
| --- | --- |
| High Density Polyethylene (USILS 506-00) | 80 |
| Ethylene Propylene Polymer (Dupont Nordel 2722) | 20 |
| Kaolin Clay, Silane Treated (Freeport Kaolin Translink 37) | 28.5 |
| A 1:1 admixture of Polytetrafluoroethylene with Translink 37 silane-treated clay | 3 |
| Black color concentrate | 8 |
| Zinc salt of 2-mercaptobenzimdazole | 6 |
| Irganox 1010 Antioxidant (Ciba Geigy)* | 3 |
| Antimony oxide | 15 |
| Zinc oxide | 5 |
| Ethylene bis (tetrabromophthalimide) | 30 |
| Vinyl tris (2-methoxyethoxy) Silane | 1 |
| Peroxide | 2 |

*Tetrakis[methylene 3-(3',5'-di-tert-butyl-4'-hydroxyphenyl)propionate]methane

A Banbury mixer (Model 11) is set to these temperatures: side 125° F.; door 125° F.; and rotor 50° F. All of the components except the peroxide are mixed at a temperature of about 320° F. and transferred to a two roll mill having a front roll temperature of about 240° F. and a back roll temperature of about 140° F. A strip from the mill is passed through a dicer to give pellets about 3 by 4 millimeters in size. The above mentioned 2 parts of a peroxide are incorporated into the pellets by absorption followed by extrusion onto copper wire and curing the insulated wire in 250 psi (400° F.) steam.

Microscopic examination of the cured polymeric insulation showed excellent homogeneity and dispersion.

When the above example was done by adding the Teflon 6 neat, without prior gentle subdivision and intermingling with Translink 37, then dispersion was poor and many "whiskers" of Teflon 6 were evident in the cured insulation and on the extruder screen pack.

We claim:

1. A method of dispersing a fluoroplastic in a polymer composition, said method comprising the steps of:
    (a) comminuting the fluoroplastic to a uniform dispersion;
    (b) admixing with the fluoroplastic a finely divided solid adherent material that will coat at least a portion of said fluoroplastic to form a coated fluoroplastic; and
    (c) combining said coated fluoroplastic with a polymer using intensive mixing means.

2. A method as defined in claim 1 wherein the fluoroplastic is comminuted to a range of from about 4 to 35 U.S. standard mesh.

3. A method as defined in claim 2 wherein the finely divided solid material is selected from the group consisting of aluminum silicate, silica, talc, alumina, wollastonite, graphitic carbon blacks and amorphous carbon blacks.

4. A method as define in claim 3 wherein the finely divided solid material is pretreated with derivatives of silane.

5. A method as defined in claim 3 wherein the finely divided solid material pretreatment includes a silicone.

6. A method as defined in claim 4 wherein the polymer composition contains a polymer selected from the group consisting of polyolefins, chlorinated polyolefins, ethylene vinyl acetate copolymers, ethylene-propylene rubber, ethylene-propylene terpolymer and polychloroprene.

7. A method as defined in claim 5 wherein the fluoroplastic is selected from the group consisting of polytetrafluoroethylene, fluorinated ethylene copolymer, perfluoroalkyoxy resin, ethylene-tetrafluoroethylene copolymer, polyvinylidene fluoride, polychlorotrifluoroethylene, ethylene-chlorotrifluoroethylene and polyvinylfluoride.

8. A method as defined in claim 6 wherein the fluoroplastic is polytetrafluoroethylene.

9. A method as defined in claim 7 wherein the finely divided solid material is aluminum is slicate.

10. A method as define in claim 8 wherein the polymer is a polyolefin.

11. A method as defined in claim 9 wherein the polymer is polyethylene.

12. A method as defined in claim 11 wherein the fluoroplastic is polytetrafluoroethylene.

13. A method of dispersing a fluoroplastic in a polymer composition, said method consisting essentially of:
    (a) comminuting polytetrafluoroethylene to a uniform dispersion;
    (b) dry blending with said polytetrafluoroethylene a finely divided solid adherent material that will coat at least a portion of said polytetrafluoroethylene to form a coated polytetrafluoroethylene; and
    (c) combining said coated polytetrafluoroethylene with a polymer using intensive mixing means.

* * * * *